United States Patent [19]

Hamprecht et al.

[11] Patent Number: 5,644,039
[45] Date of Patent: Jul. 1, 1997

[54] MIXTURES OF BLUE DISPERSE AZO DYESTUFFS

[75] Inventors: Rainer Hamprecht, Odenthal; Heinz-Dietrich Jordan, Leverkusen, both of Germany

[73] Assignee: Bayer Aktiengesellschaft, Leverkusen, Germany

[21] Appl. No.: 542,761

[22] Filed: Oct. 13, 1995

[30] Foreign Application Priority Data

Oct. 20, 1994 [DE] Germany .................. 44 37 551.4

[51] Int. Cl.$^6$ .................. C09B 67/22; C09B 67/38; C09B 29/08; D06P 1/18
[52] U.S. Cl. .................. 534/573; 8/639; 534/753; 534/856
[58] Field of Search .................. 534/573 M, 856; 8/639

[56] References Cited

U.S. PATENT DOCUMENTS

| 3,962,209 | 6/1976 | Gotteschlich et al. | 534/597 |
| 4,105,655 | 8/1978 | Gottschlich et al. | 534/852 |
| 4,374,642 | 2/1983 | Brandt et al. | 8/639 |
| 4,494,957 | 1/1985 | Niwa et al. | 534/573 X |
| 4,872,883 | 10/1989 | Bühler et al. | 8/639 |
| 4,908,041 | 3/1990 | Hahn et al. | 8/638 |
| 4,937,325 | 6/1990 | Buhler et al. | 534/573 |
| 5,062,861 | 11/1991 | Hahn et al. | 8/639 |
| 5,160,348 | 11/1992 | Hoppe et al. | 8/639 |
| 5,174,792 | 12/1992 | Tsumura et al. | 8/639 |

FOREIGN PATENT DOCUMENTS

| 0392359 | 10/1990 | European Pat. Off. | 534/573 M |
| 0392358 | 10/1990 | European Pat. Off. | 8/639 |
| 58-38762 | 3/1983 | Japan | 534/573 M |

OTHER PUBLICATIONS

O. Annen, et al., Rev. Prog. Coloration, vol. 17, pp. 72–85, (1987).

Primary Examiner—Floyd D. Higel
Attorney, Agent, or Firm—Sprung Horn Kramer & Woods

[57] ABSTRACT

Mixtures of dyestuffs of the formulae (I) and (II)

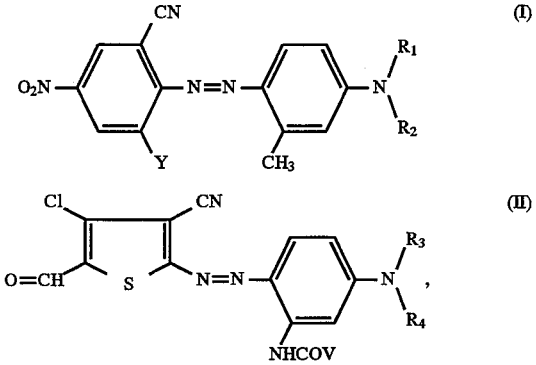

which are outstanding substitute products for the anthraquinone dyestuff Disperse Blue 56, have been found.

10 Claims, No Drawings

MIXTURES OF BLUE DISPERSE AZO DYESTUFFS

The present invention relates to mixtures of azo dyestuffs and to preparations comprising these for dyeing hydrophobic synthetic fibres which are suitable, for example, as a substitute for the anthraquinoid C.I. Disperse Blue 56 (C.I. No. 63285).

Disperse Blue 56 is regarded as an important blue disperse dyestuff worldwide, since this leads to particularly clear, reddish-blue dyeings of high lightfastness on the fibre materials mentioned. On the other hand, this dyestuff has a number of disadvantages.

Like almost all anthraquinone dyestuffs, Disperse Blue 56 has a low tinctorial strength, which results in a considerable increase in costs for good depths of colour in particular.

When mixtures of polyester fibres and wool, cotton or regenerated cellulose are dyed, these concomitant fibres are stained heavily. This staining cannot be removed completely even by reductive after-treatment.

When dyeing by the modern high-speed dyeing processes, there is a great risk of a non-level dyeing. Disperse Blue 56 belongs to the particularly poorly levelling disperse blue dyestuffs if an excessively long dyeing time is not applied for subsequent levelling.

The sensitivity of Disperse Blue 56 towards metal ions—in particular copper—in the dyebath is a further disadvantage, and for this reason complexing agents must often be added to the dyebath.

In order to at least partly eliminate the inadequacies of the anthraquinone dyestuff while retaining the colour shade, blends of the expensive anthraquinone dyestuff with cheap azo dyestuffs and mixtures of other anthraquinone dyestuffs with azo compounds have been recommended as a "Blue 56 substitute" (cf. U.S. Pat. No. -4,374,642). It has furthermore already been proposed to replace Disperse Blue 56 by selected blue azo dyestuffs (cf. O. Annen, R. Egli, R. Hasler, B. Henzi, H. Jakob and P. Matzinger REV. PROGR. COLORATION, 72 Vol. 17 (1987).

A number of blue azo dyestuff mixtures furthermore have already been described. Thus, for example, mixtures of diphenylazo dyestuffs are known from EP-277 529. EP 392 359 and EP-311 910 describe mixtures of thiophene-azo dyestuffs, and EP-347 685 discloses blue dyestuff mixtures of diphenylazo and thiophene-azo dyestuffs.

The object of the present invention was to improve the blue dyestuff mixtures known from the prior art in respect of their use properties to the extent that they are even more suitable Disperse Blue 56 substitute products.

Mixtures of disperse azo dyestuffs which result in a significantly improved substitute product for Disperse Blue 56 in practically all the important properties have now been found, and are characterized in that they comprise a) at least one dyestuff of the formula (I)

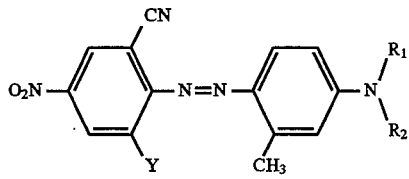

and b) at least one dyestuff of the formula (II)

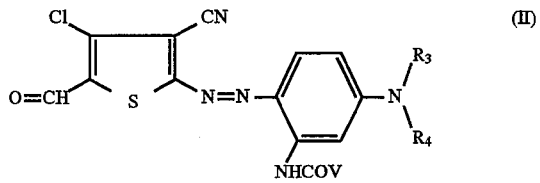

wherein

Y denotes $NO_2$ or CN,

V denotes H, alkyl, alkoxyalkyl, aryloxyalkyl, aryl or alkoxy, $R_1$ denotes alkyl, aralkyl, alkoxyalkyl or alkenyl, $R_2$ denotes alkyl, aralkyl, alkoxyalkyl, alkenyl, chloroalkyl, aryloxyalkyl or alkoxycarbonylalkyl, $R_3$ denotes alkyl, aralkyl, alkoxyalkyl, hydroxyalkyl, aryloxyalkyl, alkenyl, acyloxyalkyl or alkoxycarbonylalkyl and $R_4$ denotes alkyl, aralkyl, alkoxyalkyl, hydroxyalkyl, aryloxyalkyl, alkenyl, acyloxyalkyl, alkoxycarbonylalkyl or $C_2$–$C_4$-chloroalkyl.

Preferred mixtures of dyestuffs of the formulae (I) and (II) are therefore characterized in that the acyl, alkyl and alkoxy radicals mentioned in any desired connection in their substituent definitions are those having 1 to 4 C atoms which are unsubstituted or substituted, preferably by substituents such as cyano or $C_1$–$C_4$-alkoxy, but in particular are unsubstituted, alkenyl radicals are those having 2 to 5 C atoms and the aryl radicals mentioned in any desired connection are those having 6 to 10 C atoms, in particular phenyl radicals, which are unsubstituted or substituted by Cl and/or $C_1$–$C_4$-alkyl.

Mixtures of dyestuffs of the formulae (I) and (II) which are furthermore preferred are those
wherein Y denotes $NO_2$ or CN, V denotes $C_1$–$C_5$-alkyl, $C_1$–$C_5$-alkoxy-$C_1$–$C_5$-alkyl, $C_6$–$C_{10}$-aryl or $C_1$–$C_5$-alkoxy, $R_1$ denotes $C_1$–$C_5$-alkyl, $C_1$–$C_5$-alkoxy-$C_2$–$C_5$-alkyl or $C_2$–$C_5$-alkenyl, $R_2$ denotes $C_1$–$C_5$-alkyl, $C_1$–$C_5$-alkoxy-$C_2$–$C_5$-alkyl, $C_2$–$C_5$-alkenyl, $C_6$–$C_{10}$-aryl-$C_1C_5$-alkyl or $C_6$–$C_{10}$-aryloxy-$C_1$–$C_5$-alkyl and $R_3$ and $R_4$ independently of one another denote $C_1$–$C_5$-alkyl, $C_6$–$C_{10}$-aryl-$C_1$–$C_5$-alkyl, $C_1$–$C_5$-alkoxy-$C_2$–$C_5$-alkyl or $C_2$–$C_5$-alkenyl.

Particularly preferred mixtures of dyestuffs of the formulae (I) and (II) are those
wherein Y denotes $NO_2$ or CN, V denotes methyl, ethyl, n-propyl, iso-propyl, n-butyl, methoxymethyl, methoxyethyl or ethoxyethyl, $R_1$ denotes methyl, ethyl, n-propyl, iso-propyl or n-butyl, $R_2$ denotes methyl, ethyl, n-propyl, iso-propyl, n-butyl, methoxyethyl, ethoxyethyl or

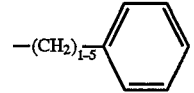

and

R$_3$ and R$_4$ independently of one another denote methyl, ethyl, n-propyl, iso-propyl, n-butyl, methoxyethyl or ethoxyethyl.

Particularly suitable mixtures of dyestuffs of the formulae (I) and (II) are those
wherein Y denotes CN, V denotes methyl or methoxymethyl, R$_1$ denotes methyl, ethyl, n-propyl or n-butyl, R$_2$ denotes ethyl, n-propyl, n-butyl or

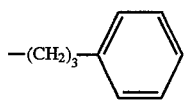

and

R$_3$ and R$_4$ independently of one another denote ethyl or n-propyl.

The dyestuffs of the formulae (I) and (II) are known or are readily accessible by methods known per se, and are described, for example, in the following patent literature: DE-A-1 290915=U.S. Pat. No. -4,105,655; EP-311 910, EP-392358 and EP-392 359.

In comparison with the last three European Applications mentioned, it must be described as decidedly surprising that clear blue colour shades corresponding to the nuance of Disperse Blue 56 can be achieved by means of the mixture according to the invention, since from these sources explicitly only those dyestuff mixtures which comprise various thiophene-azo dyestuffs but which give only navy blue to black colour shades are described.

Individual dyestuffs of the formulae (I) and (II) are mentioned by way of example in the tables below:

TABLE 1

Dyestuffs of the formula (I) where Y = CN or NO$_2$ and wherein R$_1$ and R$_2$ have the following meanings.

| No. | R$_1$ | R$_2$ |
|---|---|---|
| 1 | CH$_3$ | CH$_3$ |
| 2 | CH$_3$ | C$_2$H$_5$ |
| 3 | CH$_3$ | CH$_2$—CH$_2$—CH$_3$ |
| 4 | CH$_3$ | CH—(CH$_3$)$_2$ |
| 5 | CH$_3$ | —CH$_2$—CH$_2$—CH$_2$—CH$_3$ |
| 6 | CH$_3$ | —CH$_2$—CH=CH$_2$ |
| 7 | CH$_3$ | —CH$_2$—C$_6$H$_5$ |
| 8 | CH$_3$ | —CH$_2$—CH$_2$—CH$_2$—C$_6$H$_5$ |
| 9 | CH$_3$ | —CH$_2$—CH$_2$—O—CH$_3$ |
| 10 | CH$_3$ | —CH$_2$—CH$_2$—OC$_2$H$_5$ |
| 11 | CH$_3$ | —CH$_2$—CH$_2$—O—CH$_2$—CH$_2$CH$_3$ |
| 12 | CH$_3$ | —CH$_2$—CH$_2$—Cl |
| 13 | CH$_3$ | —CH$_2$—CH$_2$—O—C$_6$H$_5$ |
| 14 | CH$_3$ | —CH$_2$—CH$_2$—O—C$_6$H$_4$—CH$_3$ |
| 15 | CH$_3$ | —(CH$_2$)—CH$_2$—O—C$_6$H$_4$—Cl |
| 16 | —C$_2$H$_5$ | —CH$_2$—CH$_2$—O—CH$_3$ |
| 17 | —C$_2$H$_5$ | —CH$_2$—CH$_2$—OC$_2$H$_5$ |
| 18 | —C$_2$H$_5$ | —CH$_2$—CH$_2$—O—CH$_2$—CH$_2$—CH$_3$ |
| 19 | —C$_2$H$_5$ | —CH$_2$—CH$_2$—Cl |
| 20 | —C$_2$H$_5$ | —(CH$_2$)—CH$_2$—O—C$_6$H$_5$ |

TABLE 1-continued

Dyestuffs of the formula (I) where Y = CN or NO₂ and wherein R₁ and R₂ have the following meanings.

| No. | R₁ | R₂ |
|---|---|---|
| 21 | —C₂H₅ | —(CH₂)=CH₂—O—C₆H₄—CH₃ |
| 22 | —C₂H₅ | —(CH₂)—CH₂—O—C₆H₄—Cl |
| 23 | | |
| 24 | —CH₂—CH₂—CH₃ | —CH₂—CH₂—CH₃ |
| 25 | —CH₂—CH₂—CH₃ | CH—(CH₃)₂ |
| 26 | —CH₂—CH₂—CH₃ | —CH₂CH₂—CH₂—CH₃ |
| 27 | —CH₂—CH₂—CH₃ | —CH₂—CH=CH₂ |
| 28 | —CH₂—CH₂—CH₃ | —CH₂—C₆H₅ |
| 29 | —CH₂—CH₂—CH₃ | —CH₂—CH₂—CH₃—C₆H₅ |
| 30 | —CH₂—CH₂—CH₃ | —CH₂—CH₂—O—CH₃ |
| 31 | C₂H₅ | C₂H₅ |
| 32 | C₂H₅ | CH₂—CH₂—CH₃ |
| 33 | C₂H₅ | CH—(CH₃)₂ |
| 34 | C₂H₅ | —CH₂—CH₂—CH₂—CH₃ |
| 35 | C₂H₅ | —CH₂—CH=CH₂ |
| 36 | C₂H₅ | —CH₂—C₆H₅ |
| 37 | C₂H₅ | —CH₂—CH₂—CH₃—C₆H₅ |
| 38 | CH₂—(CH₂)₂—CH₃ | —CH—(CH₃)₂ |
| 39 | CH₂—(CH₂)₂—CH₃ | —CH₂—CH₂—CH₂—CH₃ |
| 40 | CH₂—(CH₂)₂—CH₃ | —CH₂—CH=CH₂ |
| 41 | CH₂—(CH₂)₂—CH₃ | —CH₂—C₆H₅ |
| 42 | CH₂—(CH₂)₂—CH₃ | —CH₂—CH₂—CH₃—C₆H₅ |
| 43 | CH₂—(CH₂)₂—CH₃ | CH₂—CH₂—O—CH₃ |
| 44 | —CH₂—CH₂—CH₃ | —CH₂—CH₂—OC₂H₅ |
| 45 | —CH₂—CH₂—CH₃ | —CH₂—CH₂—O—CH₂—CH₂—CH₃ |
| 46 | —CH₂—CH₂—CH₃ | —CH₂—CH₂—Cl |
| 47 | —CH₂—CH₂—CH₃ | —CH₂—CH₂—O—C₆H₅ |

TABLE 1-continued

Dyestuffs of the formula (I) where Y = CN or NO$_2$ and wherein R$_1$ and R$_2$ have the following meanings.

| No. | R$_1$ | R$_2$ |
|---|---|---|
| 48 | —CH$_2$—CH$_2$—CH$_3$ | —CH$_2$—CH$_2$—O—C$_6$H$_4$—CH$_3$ |
| 49 | —CH$_2$—CH$_2$—CH$_3$ | —CH$_2$—CH$_2$—O—C$_6$H$_4$—Cl |
| 50 | | |
| 51 | CH$_2$—(CH$_2$)$_2$—CH$_3$ | —CH$_2$—CH$_2$—OC$_2$H$_5$ |
| 52 | CH$_2$—(CH$_2$)$_2$—CH$_3$ | —CH$_2$—CH$_2$—O—CH$_2$—CH$_2$—CH$_3$ |
| 53 | CH$_2$—(CH$_2$)$_2$—CH$_3$ | —CH$_2$—CH$_2$—Cl |
| 54 | CH$_2$—(CH$_2$)$_2$—CH$_3$ | —CH$_2$—CH$_2$—O—C$_6$H$_5$ |
| 55 | CH$_2$—(CH$_2$)$_2$—CH$_3$ | —C$_6$H$_4$—CH$_3$ |
| 56 | CH$_2$—(CH$_2$)$_2$—CH$_3$ | —C$_6$H$_4$—Cl |

TABLE 2

Dyestuffs of the formula (II)

| No. | V | R$_3$ | R$_4$ |
|---|---|---|---|
| 1 | CH$_3$ | CH$_3$ | CH$_3$ |
| 2 | CH$_3$ | C$_2$H$_5$ | C$_2$H$_5$ |
| 3 | CH$_3$ | CH$_2$—CH$_2$—CH$_3$ | CH$_2$—CH$_2$—CH$_3$ |
| 4 | CH$_3$ | C$_2$H$_5$ | CH$_2$—CH$_2$—O—CH$_3$ |
| 5 | CH$_3$ | C$_2$H$_5$ | CH$_2$—CH$_2$—O—C$_2$H$_5$ |
| 6 | CH$_3$ | —(CH$_2$)$_2$—CH$_3$ | CH$_2$—CH$_2$—O—CH$_3$ |
| 7 | CH$_3$ | —(CH$_2$)$_2$—CH$_3$ | CH$_2$—CH$_2$—O—C$_2$H$_5$ |
| 8 | CH$_3$ | CH$_2$—CH$_2$—OCH$_3$ | CH$_2$—CH$_2$—OCH$_3$ |
| 9 | CH$_3$ | CH$_2$—CH$_2$—O—C$_2$H$_5$ | CH$_2$—CH$_2$—O—C$_2$H$_5$ |
| 10 | CH$_2$—CH$_2$—CH$_3$ | CH$_3$ | CH$_3$ |
| 11 | CH$_2$—CH$_2$—CH$_3$ | C$_2$H$_5$ | C$_2$H$_5$ |
| 12 | CH$_2$—CH$_2$—CH$_3$ | CH$_2$—CH$_2$—CH$_3$ | CH$_2$—CH$_2$—CH$_3$ |
| 13 | CH$_2$—CH$_2$—CH$_3$ | C$_2$H$_5$ | CH$_2$—CH$_2$—O—CH$_3$ |
| 14 | CH$_2$—CH$_2$—CH$_3$ | C$_2$H$_5$ | CH$_2$—CH$_2$—O—C$_2$H$_5$ |
| 15 | CH$_2$—CH$_2$—CH$_3$ | —(CH$_2$)$_2$—CH$_3$ | CH$_2$—CH$_2$—O—CH$_3$ |
| 16 | CH$_2$—CH$_2$—CH$_3$ | —(CH$_2$)$_2$—CH$_3$ | CH$_2$—CH$_2$—O—C$_2$H$_5$ |
| 17 | CH$_2$—CH$_2$—CH$_3$ | CH$_2$—CH$_2$—OCH$_3$ | CH$_2$—CH$_2$—OCH$_3$ |
| 18 | CH$_2$—CH$_2$—CH$_3$ | CH$_2$—CH$_2$—O—C$_2$H$_5$ | CH$_2$—CH$_2$—O—C$_2$H$_5$ |
| 19 | CH$_2$—CH$_2$—CH$_2$—CH$_3$ | CH$_3$ | CH$_3$ |
| 20 | CH$_2$—CH$_2$—CH$_2$—CH$_3$ | C$_2$H$_5$ | C$_2$H$_5$ |
| 21 | CH$_2$—CH$_2$—CH$_2$—CH$_3$ | CH$_2$—CH$_2$—CH$_3$ | CH$_2$—CH$_2$—CH$_3$ |
| 22 | CH$_2$—CH$_2$—CH$_2$—CH$_3$ | C$_2$H$_5$ | CH$_2$—CH$_2$—O—CH$_3$ |
| 23 | CH$_2$—CH$_2$—CH$_2$—CH$_3$ | C$_2$H$_5$ | CH$_2$—CH$_2$—O—C$_2$H$_5$ |
| 24 | CH$_2$—CH$_2$—CH$_2$—CH$_3$ | —(CH$_2$)$_2$—CH$_3$ | CH$_2$—CH$_2$—O—CH$_3$ |
| 25 | CH$_2$—CH$_2$—CH$_2$—CH$_3$ | —(CH$_2$)$_2$—CH$_3$ | CH$_2$—CH$_2$—O—C$_2$H$_5$ |
| 26 | CH$_2$—CH$_2$—CH$_2$—CH$_3$ | CH$_2$—CH$_2$—OCH$_3$ | CH$_2$—CH$_2$—OCH$_3$ |
| 27 | CH$_2$—CH$_2$—CH$_2$—CH$_3$ | CH$_2$—CH$_2$—O—C$_2$H$_5$ | CH$_2$—CH$_2$—O—C$_2$H$_5$ |
| 28 | CH$_3$ | C$_2$H$_4$OC$_6$H$_5$ | C$_2$H$_4$OC$_6$H$_5$ |
| 29 | CH$_3$ | CH$_2$—CH=CH$_2$ | CH$_2$—CH=CH$_2$ |
| 30 | CH$_3$ | CH$_2$—CH$_2$O—COCH$_3$ | CH$_2$CH$_2$O—COCH$_3$ |
| 31 | CH$_3$ | CH$_2$CH$_2$CH$_2$CH$_3$ | CH$_2$CH$_2$CH$_2$CH$_3$ |
| 32 | CH$_3$ | CH$_2$CH$_2$CH$_2$CO$_2$CH$_3$ | CH$_2$CH$_2$CH$_2$CO$_2$CH$_3$ |
| 33 | C$_2$H$_5$ | C$_2$H$_5$ | C$_2$H$_5$ |

TABLE 2-continued

Dyestuffs of the formula (II)

| No. | V | $R_3$ | $R_4$ |
|---|---|---|---|
| 34 | $C_2H_5$ | $CH_2CH_2CH_3$ | $CH_2CH_2CH_3$ |
| 35 | $C_2H_5$ | $CH_2-CH=CH_2$ | $CH_2-CH=CH_2$ |
| 36 | $C_2H_5$ | $CH_2CH_2CH_2CO_2CH_3$ | $CH_2CH_2CH_2CO_2CH_3$ |
|    | $C_2H_5$ | $C_2H_4OCH_3$ | $C_2H_4OCH_3$ |
| 37 | $CH_2OCH_3$ | $C_2H_5$ | $C_2H_5$ |
| 38 | $CH_2OCH_3$ | $CH_2CH_2CH_3$ | $CH_2CH_2CH_3$ |
| 39 | $CH_2OCH_3$ | $CH_2CH_2OCH_3$ | $CH_2CH_2OCH_3$ |

The weight content of the individual dyestuffs in the mixtures according to the invention is in general:

5 to 95% of dyestuff of the formula I (based on the mixture) and 95 to 5% of dyestuff of the formula II (based on the mixture).

In a preferred type of mixture, the contents are:

10 to 90% of dyestuff of the formula I (based on the mixture) and to 10% of dyestuff of the formula II (based on the mixture).

Preferred mixtures are obtained by using the following diphenylazo dyestuffs and thiophene-azo dyestuffs A–D:

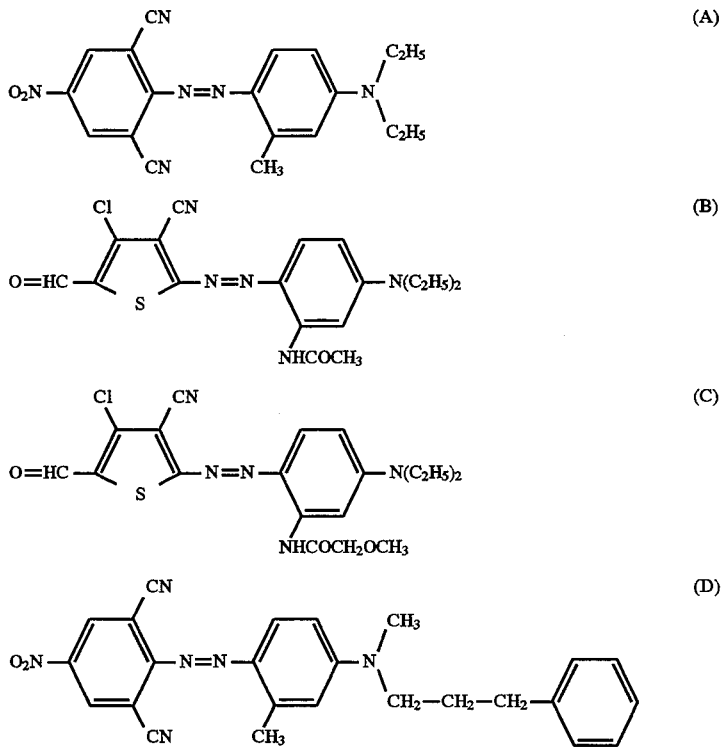

The following mixture ratios are preferred here:
a) 10 to 90% of dyestuff A 90 to 10% of dyestuff B
b) 20 to 80% of dyestuff A 80 to 20% of dyestuff B
c) 25 to 45% of dyestuff A 75 to 55% of dyestuff B
d) 10 to 90% of dyestuff A 90 to 10% of dyestuff C
e) 20 to 80% of dyestuff A 80 to 20% of dyestuff C
f) 40 to 60% of dyestuff A 60 to 40% of dyestuff C
g) 5 to 95% of dyestuff D 95 to 5% of dyestuff B
h) 5 to 30% of dyestuff D 95 to 70% of dyestuff B
i) 5 to 20% of dyestuff D 95 to 80% of dyestuff B
j) 10 to 90% of dyestuff D 90 to 10% of dyestuff C
k) 10 to 50% of dyestuff D 90 to 50% of dyestuff C
l) 20 to 40% of dyestuff D 80 to 60% of dyestuff C The "cyanation" of ortho-halogenoazo dyestuffs and the dicyano dyestuffs thereby obtained—as such—are generally known (cf. DE-A-1 544 563=U.S. Pat. No. -3,962,209 and DE-A-3 009 635).

The dyestuff mixtures according to the invention can be prepared by various processes, for example by mixing the separately prepared and separately formulated individual dyestuffs. This mixing process is carried out in suitable mixers, such as, for example, tumble mixers, in suitable mills, for example bead and sand mills. However, separately finished individual dyestuffs can also be mixed by stirring into dye liquors.

The mixtures according to the invention are preferably obtained by finishing the separately prepared individual components together.

This finishing together is characterized in that a dyestuff mixture in each case of at least one of the solids of the general formulae (I) and (II) is ground in the presence of dispersing agents in suitable mills, such as, for example, bead or sand mills, and, if a pulverulent dyestuff finished form is to be prepared, the mixture is then spray dried.

The invention furthermore relates to dyestuff preparations comprising the dyestuff mixtures according to the invention.

Suitable dispersing agents are, for example, anionic or nonionic dispersing agents, which can also be employed together. Anionic dispersing agents are, for example, condensation products of aromatic sulphonic acids and formaldehyde, in particular condensation products of alkylnaphthalenesulphonic acids and formaldehyde, condensation products of optionally substituted phenol with formaldehyde and sodium bisulphite, alkali metal salts of condensation products of optionally substituted phenol, naphthalene or naphtholsulphonic acids, formaldehyde and sodium bisulphite, alkali metal salts of condensation products of optionally substituted phenolsulphonic acids, formaldehyde and urea, and alkali metal salts of ligninsulphonic acids; alkyl- or alkyl-aryl-sulphonates, and alkyl-aryl polyglycol ether sulphates. Nonionic dispersing agents or emulsifiers are, for example, reaction products of alkylene oxides, such as, for example, ethylene oxide or propylene oxide, with alkylatable compounds, such as, for example, fatty alcohols, fatty amines, fatty acids, phenols, alkylphenols, arylalkylphenols, arylalkylarylphenols and carboxylic acid amides, such as, for example, addition products of 5 to 10 ethylene oxide units on $C_8$–$C_{10}$-alkylphenols.

Grinding is in general carried out at temperatures between 10° and 90° C., preferably at 30° to 60° C. If separately prepared individual components are finished together, they are advantageously ground together at temperatures above 30° C. The dyestuff particles are thereby comminuted mechanically until an optimum specific surface area is achieved and sedimentation of the dyestuff is as low as possible. The particle size of the dyestuffs is in general between 0.5 and 5 μm, preferably about 1 μm.

It may be advantageous to subject the separately prepared individual components of the dyestuff mixture to heat treatment together before they are ground together. This heat treatment is characterized in that the individual components of the dyestuff mixture are heated at temperatures of 50° to 150° C., preferably 90 to 130° C., in water for half an hour to several hours, if appropriate under pressure, and are cooled again. This heating is advantageously carried out in the presence of one or more dispersing agents or of an organic solvent. Such organic solvents are, for example, methanol, ethanol, dimethylformamide or dimethylsulphoxide, but preferably solvents which have a low solubility in water, such as toluene, chlorobenzene, 1,2-dichlorobenzene or butylacetate. After the heat treatment, these solvents are distilled off again.

A preferred pretreatment of the individual components of the dyestuff mixture before they are ground together is dissolving the individual components together in an organic solvent or solvent mixture with subsequent crystallization or precipitation, isolation, for example by filtration, and removal of solvent residues, for example by washing.

The dyestuff dispersions thus obtained can be used very advantageously for preparing printing pastes and dye liquors. They offer particular advantages, for example, in continuous processes in which the dyestuff concentration of the dye liquors must be kept constant by continuous feeding of dyestuff into the running apparatus.

For certain fields of use, powder formulations are preferred. These powders comprise the dyestuff mixture, dispersing agents and if appropriate other auxiliaries, such as, for example, wetting agents, oxidizing agents, preservatives and dust removal agents.

A preferred preparation process for pulverulent dyestuff formulations comprises removing the liquid from the liquid dyestuff dispersions described above, for example by vacuum drying or freeze drying, by drying on roll dryers, but preferably by spray drying.

The dyestuff preparations according to the invention in general comprise 20 to 80% by weight of the dyestuff mixture and 80 to 20% by weight of dispersing agent, in each case based on the preparation.

The dyestuff contents of the liquid dyestuff formulations are in general 20 to 40% by weight and the dispersing agent content is in general about 20 to 40% by weight, in each case based on the liquid preparation. In powder formulations, the dyestuff contents are in general 20 to 60% by weight and the dispersing agent content is in general 40 to 80% by weight, in each case based on the solid preparation. For economic reasons, the dyestuff content usually does not fall below 20% by weight.

The dyestuff mixtures according to the invention are outstandingly suitable as such or also as a mixture with other disperse dyestuffs for dyeing and printing hydrophobic synthetic fibre materials and mixtures thereof with naturally occurring fibrous materials.

Possible hydrophobic synthetic materials are, for example: cellulose 2½-acetate, cellulose triacetate, polyamides and, in particular, polyesters, such as, for example, polyethylene glycol terephthalate. Mixtures thereof with naturally occurring fibrous materials are, for example, those with cotton, regenerated cellulose fibres or wool.

The invention is explained in more detail by the following examples:

In the following examples, "parts" and "%"=parts by weight and percentages by weight respectively.

EXAMPLE 1

A dyestuff preparation of 13 parts of dyestuff A, 26 parts of dyestuff B, 61 parts of standardizing agent based on commercially available ligninsulphonates, commercially available dispersing agents (condensation product of formaldehyde, naphthalene and sulphuric acid), commercially available wetting agents (alkoxylated alkylphenols) and commercially available dust removal agents (mineral oil with emulsifiers) and 6.0 parts of residual moisture is prepared by bead grinding and subsequent spray drying.

In a dye bath which is brought to a pH of 4.5 with sodium phosphate and acetic acid, 100 parts of a polyester fabric (polyethylene terephthalate) are dyed with 0.75 g of the dye preparation described above (liquor ratio 1:10 to 1:40) at 125° to 135° C. for 30 to 45 minutes.

Clear, reddish-blue dyeings having good fastnesses are obtained.

EXAMPLE 2

In a dye bath which comprises 5 g/l of a commercially available carrier (for example based on an aromatic carboxylic acid ester) and is brought to a pH of 4.5 with sodium phosphate and acetic acid, 100 parts of a polyester fabric are dyed with 0.75 part of the dyestuff preparation described above at 90° to 105° C. for 30 minutes. Full, deep blue dyeings having good fastnesses are obtained.

EXAMPLE 3

In a dye bath which is brought to a pH of 4.5 with sodium phosphate and acetic acid, 200 parts of a polyester (polyethylene terephthalate)/cotton 50/50 blend fabric are dyed with 0.75 part of the dye preparation described above (liquor ratio 1: 10 to 1:40) at 125° to 135° C. for 30 to 45 minutes. Clear blue dyeings having good fastnesses are obtained.

EXAMPLE 4

In a dye bath which comprises 5 g/l of a commercially available carrier (for example based on an aromatic carboxylic acid ester) and is brought to a pH of 4.5 with sodium phosphate and ethyl acetate, 200 parts of a polyester/wool 50/50 blend fabric are dyed with 0.75 part of the dyestuff preparation described above at 90° to 105° C. for 30 minutes. Full, deep blue dyeings having good fastnesses are obtained.

Similar results are achieved by using the following mixtures, which have been prepared analogously to Example 1.

EXAMPLE 5

50% of dyestuff A
50% of dyestuff C

EXAMPLE 6

45% of dyestuff A
55% of dyestuff C

EXAMPLE 7

55% of dyestuff A
45% of dyestuff C

EXAMPLE 8

13% of dyestuff D
87% of dyestuff B

EXAMPLE 9

8% of dyestuff D
92% of dyestuff B

EXAMPLE 10

20% of dyestuff D
80% of dyestuff B

EXAMPLE 11

26.5% of dyestuff D
73.5% of dyestuff C

EXAMPLE 12

20% of dyestuff D
80% of dyestuff C

EXAMPLE 13

30% of dyestuff D
70% of dyestuff C

EXAMPLE 14 (Comparison Example)

Two mixtures according to the invention (II and III) were compared with the dyestuff mixture (Mixture I) known from EP-A 347 685 (Example 11), comprising the dyestuff of the formula (A) and the thiophene-azo dyestuff of the formula (E)

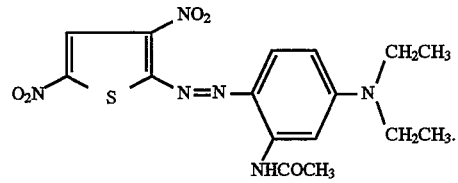

For this purpose, the contents of the individual dyestuffs were chosen such that the colour shade of the particular mixture corresponds to that of Disperse Blue 56. This was realized by Mixtures I, II and III, the dyestuff ratios of which can be seen from the table.

| Mixture of dyestuff | Mixture I* (prior art) | Mixture II** (according to the invention) | Mixture III** (according to the invention) |
| --- | --- | --- | --- |
| A | 61 | 32.7 | 50 |
| B | — | 67.3 | — |
| C | — | — | 50 |
| E | 39 | — | — |

*Ratio of the standardized individual dyestuffs
**Ratio of the crude dyestuffs

A) The lightfastness of the particular dyestuff mixtures II and III according to the invention is significantly better than that of Mixture I from the prior art.

| Lightfastness | |
| --- | --- |
| Mixture I | 6 |
| Mixture II | 6–7 |
| Mixture III | 6–7 |

B) Significant advantages in the lightfastness of the dyestuff mixtures according to the invention were also to be found in combination with other dyestuffs (combination lightfastness). For this, Mixtures I–III were each brought to the same colour shade (green) with the dyestuff of the formula (F)

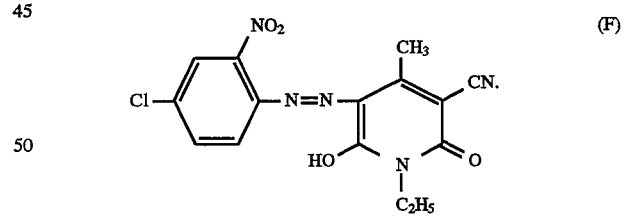

The polyester dyeings with the particular mixtures were then subjected to the lightfastness test.

| Lightfastness | |
| --- | --- |
| Mixture I + F | 6 |
| Mixture II + F | 6–7 |
| Mixture III + F | 6–7 |

C) The mixtures according to the invention have a significantly greater tinctorial strength than Disperse Blue 56. This can be seen from the dyestuff contents required to establish the same tinctorial strengths.

| Dyestuff content (based on the polyester fabric to be dyed) | |
| --- | --- |
| Disperse Blue 56 | 0.585% |
| Mixture II | 0.297% |
| Mixture III | 0.300% |

EXAMPLE 15 (Comparison Example)

Two mixtures V and VI according to the invention were compared with the dyestuff mixture (Mixture IV) described in EP-A 347 685 (cf. Table 1, page 9) comprising the dyestuff of the formula (D) and the thiophene-azo dyestuff of the formula (E).

For this purpose, the contents of the individual dyestuffs were chosen such that the colour shade of the particular mixture corresponds to that of Disperse Blue 56. This was realized by Mixtures IV, V and VI, the dyestuff ratios of which can be seen from the table.

| Mixture of dyestuff | Mixture IV* (prior art) | Mixture V** (according to the invention) | Mixture VI** (according to the invention) |
| --- | --- | --- | --- |
| B | — | 86.9 | — |
| C | — | — | 73.8 |
| D | 56.5 | 13.1 | 26.2 |
| E | 43.5 | — | — |

*Ratio of the standardized individual dyestuffs
**Ratio of the crude dyestuffs

A) The lightfastness of the particular Mixtures V and VI according to the invention is significantly better than that of Mixture IV from the prior art.

| Lightfastness | |
| --- | --- |
| Mixture IV | 6 |
| Mixture V | 6–7 |
| Mixture VI | 6–7 |

B) Significant advantages in the lightfastness were also to be found in combination with other dyestuffs (combination light fastness). For this, Mixtures IV–VI were each brought to the same tinctorial strength with the dyestuff of the formula (F) and the polyester dyeings obtained with them were subjected to the lightfastness test.

| Lightfastness | |
| --- | --- |
| Mixture IV + F | 6 |
| Mixture V + F | 6–7 |
| Mixture VI + F | 6–7 |

C) The mixtures according to the invention have a significantly greater-tinctorial strength than Disperse Blue 56. This can be seen from the contents of dyestuff required to establish the same tinctorial strengths.

| Dyestuff content (based on the polyester fabric to be dyed) | |
| --- | --- |
| Disperse Blue 56 | 0.585% |
| Mixture V | 0.260% |
| Mixture VI | 0.244% |

We claim:

1. Mixture of disperse azo dyestuffs, which comprises a) or more one dyestuffs of the formula (I)

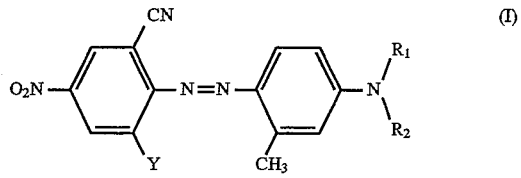

and b) or more one dyestuffs of the formula (II)

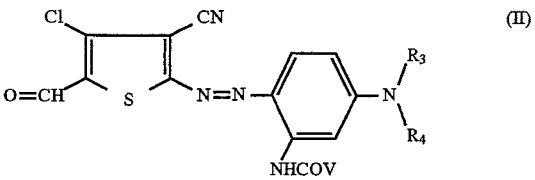

wherein

Y denotes $NO_2$ or CN,

V denotes H, alkyl, alkoxyalkyl, aryloxyalkyl, aryl or alkoxy, $R_1$ denotes alkyl, aralkyl, alkoxyalkyl or alkenyl, $R_2$ denotes alkyl, aralkyl, alkoxyalkyl, alkenyl, chloroalkyl, aryloxyalkyl or alkoxycarbonylalkyl, $R_3$ denotes alkyl, aralkyl, alkoxyalkyl, hydroxyalkyl, aryloxyalkyl, alkenyl, acyloxyalkyl or alkoxycarbonylalkyl and $R_4$ denotes alkyl, aralkyl, alkoxyalkyl, hydroxyalkyl, aryloxyalkyl, alkenyl, acyloxyalkyl, alkoxycarbonylalkyl or $C_2$–$C_4$-chloroalkyl.

2. Mixture of dyestuffs of the formulae (I) and (II) according to claim 1, wherein the acyl, alkyl and alkoxy radicals mentioned are those having 1 to 4 C atoms which are unsubstituted or substituted by cyano or $C_1$–$C_4$-alkoxy, and in that the alkylene radicals are those having 2 to 5 C atoms and the aryl radicals mentioned are those having 6 to 10 C atoms which are unsubstituted or substituted by Cl $C_1$–$C_4$-alkyl.

3. Mixture according to claim 1, wherein in the formulae I and II,

V denotes $C_1$–$C_5$-alkyl, $C_1$–$C_5$-alkoxy-$C_1$–$C_5$-alkyl, $C_6$–$C_{10}$-aryl or $C_1$–$C_5$-alkoxy, $R_1$ denotes $C_1$–$C_5$-alkyl, $C_1$–$C_5$-alkoxy-$C_2$–$C_5$-alkyl or $C_2$–$C_5$-alkenyl, $R_2$ denotes $C_1$–$C_5$-alkyl, $C_1$–$C_5$-alkoxy-$C_2$–$C_5$-alkyl, $C_2$–$C_5$-alkenyl, $C_6$–$C_{10}$-aryl-$C_1$–$C_5$-alkyl or $C_6$–$C_{10}$-aryloxy-$C_1$–$C_5$-alkyl and $R_3$ and $R_4$ independently of one another denote $C_1$–$C_5$-alkyl, $C_6$–$C_{10}$-aryl-$C_1$–$C_5$-alkyl, $C_1$–$C_5$-alkoxy-$C_2$–$C_5$-alkyl or $C_2$–$C_5$-alkenyl.

4. Mixture according to claim 1, wherein in the formulae I and II,

V denotes methyl, ethyl, n-propyl, iso-propyl, n-butyl, methoxymethyl, methoxyethyl or ethoxyethyl, $R_1$ denotes methyl, ethyl, n-propyl, iso-propyl or n-butyl, $R_2$ denotes methyl, ethyl, n-propyl, iso-propyl, n-butyl, methoxyethyl, ethoxyethyl or

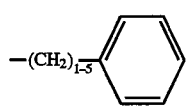

and

R₃ and R₄ independently of one another denote methyl, ethyl, n-propyl, iso-propyl, n-butyl, methoxyethyl or ethoxyethyl.

5. Mixture according to claim 1, wherein in the formulae shown,

Y denotes CN,

V denotes methyl or methoxymethyl,

R₁ denotes methyl, ethyl, n-propyl or n-butyl,

R₂ denotes ethyl, n-propyl, n-butyl or

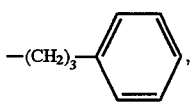

and

R₃ and R₄ independently of one another denote ethyl or n-propyl.

6. Mixture according to claim 1, wherein the weight content of the dyestuff of the formula I is 5 to 95% and that of the dyestuff of the formula II is 95 to 5%, based on the mixture.

7. Mixture according to claim 1, wherein the weight content of the dyestuff of the formula I is 10 to 90% and that of the dyestuff of the formula II is 90 to 10%, based on the mixture.

8. Mixture according to claim I, which comprises a dyestuff of the formula (A)

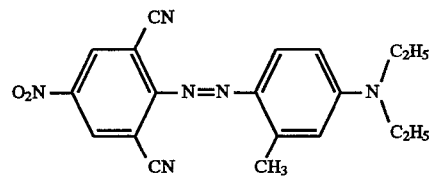

and one or more dyestuffs of the formula (B) or (C)

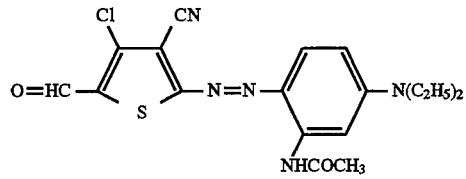

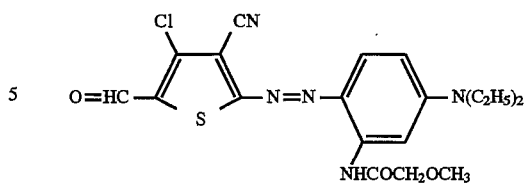

or a dyestuff of the formula (D)

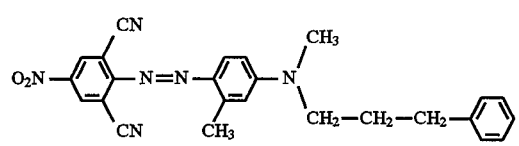

and one or more dyestuffs of the formula (B) or (C)

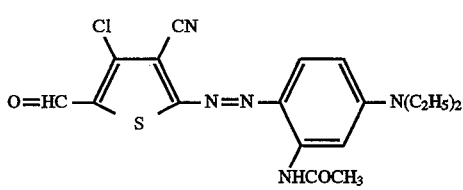

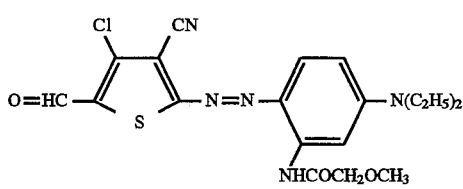

9. Dyestuff preparation comprising 20 to 80% by weight of a dyestuff mixture according to claim 1, based on the preparation, and 80 to 20% by weight of dispersing agents, based on the preparation, and if appropriate further additives.

10. Process for dyeing hydrophobic synthetic fibers and mixtures thereof with naturally occurring fibrous materials, comprising contacting said hydrophobic synthetic fibers and mixtures thereof with a dyestuff according to claim 1.

* * * * *

UNITED STATES PATENT AND TRADEMARK OFFICE
CERTIFICATE OF CORRECTION

PATENT NO.  : 5,644,039
DATED       : July 1, 1997
INVENTOR(S) : Hamprecht, et al.

It is certified that error appears in the above-indentified patent and that said Letters Patent is hereby corrected as shown below:

Col. 16, line 3    Delete " or more one " and substitute
                   -- one or more --

Col. 16, line 14   Delete " or more one " and substitute
                   -- one or more --

Col. 16, line 45   After " Cl " insert -- or --

Signed and Sealed this

Tenth Day of November 1998

Attest:

BRUCE LEHMAN

*Attesting Officer*   Commissioner of Patents and Trademarks